(12) United States Patent
Mano (10) Patent No.: US 8,459,771 B2
(45) Date of Patent: Jun. 11, 2013

(54) PRINTING DEVICE AND PRINTING METHOD

(75) Inventor: Takahiro Mano, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 95 days.

(21) Appl. No.: 13/164,224

(22) Filed: Jun. 20, 2011

(65) Prior Publication Data

US 2011/0310138 A1 Dec. 22, 2011

(30) Foreign Application Priority Data

Jun. 21, 2010 (JP) ................................. 2010-140553

(51) Int. Cl.
*B41J 29/38* (2006.01)

(52) U.S. Cl.
USPC .......................................................... 347/16

(58) Field of Classification Search
CPC ...................................................... B41J 11/42
USPC ................. 347/5, 16, 101, 102, 104
See application file for complete search history.

(56) References Cited

U.S. PATENT DOCUMENTS

| 6,217,143 B1 * | 4/2001 | Munakata et al. ............. 347/16 |
| 6,779,873 B2 * | 8/2004 | Maeda et al. .................. 347/43 |
| 7,008,040 B2 * | 3/2006 | Nakajima ....................... 347/41 |

FOREIGN PATENT DOCUMENTS

| JP | 2001-105583 A | 4/2001 |
| JP | 2008-023759 A | 2/2008 |

* cited by examiner

*Primary Examiner* — An Do
(74) *Attorney, Agent, or Firm* — Global IP Counselors, LLP (57) ABSTRACT

A printing device includes a printing section that deposits printing matter onto a printing medium, a printing control section that controls the printing section so as to cause thereto be printed on the same printing medium a first image that is based on acquired print data and a second image that extends in a width direction of the printing medium. The printing device further includes width-setting section that sets the length of the second image in the width direction to a length dependent on the size of the first image.

5 Claims, 7 Drawing Sheets

PRINTING DEVICE AND PRINTING METHOD

CROSS-REFERENCE TO RELATED APPLICATIONS

This application claims priority to Japanese Patent Application No. 2010-140553 filed on Jun. 21, 2010. The entire disclosure of Japanese Patent Application No. 2010-140553 is hereby incorporated herein by reference.

BACKGROUND

1. Technological Field

The present invention relates to a printing device and a printing method for carrying out a printing process on a printing medium, using printing matter such as ink.

2. Background Technology

Examples of printing devices provided with printing means for depositing printing matter on printing media are the devices disclosed in Patent Citations 1 and 2. The printing devices disclosed in Patent Citations 1 and 2 are large-format printing devices adapted to carry out printing processes on printing media of indefinite length (e.g., roll paper), and are provided with printing means having a print head that sprays ink as the printing matter. In the printing devices described above, a plurality of images are printed along the lengthwise direction of the printing medium, and cutoff lines (predetermined images) that extend in the width direction of the printing medium are printed between adjacent images neighboring one another in the lengthwise direction.

In a printing device, the printing process is sometimes carried out on the printing medium without having acquired length in the width direction of the medium. In cases where cutoff lines are printed on the medium in this state, there is a risk that ink that is intended to print the cutoff lines will instead be sprayed from the print head onto positions where the printing medium is not present. In such a case, there is a risk of the support member which supports the printing medium becoming soiled with ink sprayed from the print head, and hence of the printing medium which is supported by the support member becoming soiled as well.

Thus, according to the printing device disclosed in Patent Citation 1, receiving recessed sections are provided to the support member, at a plurality of positions along the width direction of the printing medium. Then, during printing of cutoff lines onto the printing medium, even if ink is sprayed onto positions where the printing medium is not present, the ink is received into the receiving recessed sections which have been provided to the support member. Because of this, soiling of the support member due to ink sprayed thereon during printing of cutoff lines onto the printing medium is minimized.

Japanese Patent Application Publication No. 2001-105583 (Patent Citation 1) is an example of the related art.
Japanese Patent Application Publication No. 2001-23759 (Patent Citation 2) is an example of the related art.

SUMMARY

Problems to be Solved by the Invention

With the printing device disclosed in Patent Citation 1, soiling of the support member during printing of cutoff lines onto the printing medium can be minimized. However, in cases where the length of the printing medium in the width direction is unknown, there is still a risk that during printing of cutoff lines onto the printing medium, ink will be sprayed from the print head onto positions where the printing medium is not present. Accordingly, there is a need for a technique whereby the spraying of ink from the print head onto positions where a printing medium is not present can be minimized during printing of cutoff lines onto the printing medium, even in cases where the length of the printing medium in the width direction is unknown, or where the positions of the edges of the printing medium in the width direction are unknown.

This problem is not limited to printing media of indefinite length such as roll paper, and may occur in analogous fashion in cases where printing processes are carried out on computer paper. Sometimes, during printing on computer paper, a dividing line (predetermined image) that extends in the width direction of the computer paper is printed on the computer paper in order to divide a first image which is printed to the upstream side and a second image which is printed to the downstream side, with respect to the conveyance direction. At such times, in cases where the length of the computer paper in the width direction is unknown, there is a risk that during printing of the dividing line, ink will be sprayed from the print head onto positions where the computer paper is not present.

With the foregoing problems in view, certain aspects of the invention are to provide a printing device and a printing method for making it possible to reduce the likelihood that, during printing of predetermined images onto a printing medium, printing matter will be supplied from printing means towards a position where the printing medium is not present.

Means Used to Solve the Above-Mentioned Problems

In order to achieve the above, the printing device of the invention provides a printing device comprising printing means for depositing printing matter onto a printing medium, and printing control means for controlling the printing means so as to cause there to be printed on the printing medium an image that is based on acquired print data, the printing control means being adapted to control the printing means so as to print on the printing medium a predetermined image that extends in a width direction of the printing medium, wherein the device further comprises width-setting means for setting the length of the predetermined image in the width direction to a length dependent on the size of the image printed on the printing medium on the basis of the print data.

According to the configuration described above, the length of a predetermined image in the width direction is set to a length dependent on the size of the image that is printed on the printing medium on the basis of print data acquired by the printing device. Then, on the basis of this setting, the predetermined image is printed on the printing medium through deposition of printing matter by the printing means. Normally, the likelihood of a printing device acquiring print data for the purpose of printing an image that has length in the width direction greater than the length of the printing medium in the width direction is considered to be quite low. Because of this, there is a high likelihood that a predetermined image having a length that is equal to or less than the length of the printing medium in the width direction will be printed on the printing medium. Consequently, during printing of the predetermined image onto the printing medium, the likelihood of printing matter being supplied from the printing means towards a position where the printing medium is not present can be reduced.

In the present Specification, a "predetermined image" refers to an image having no basis in print data acquired from outside the printing device; rather, the image is printed on the printing medium on the basis of data generated internally in the printing device.

In the printing device of the invention, the width-setting means is adapted to set the length for the second image in the width direction to a greater length in association with a greater length in the width direction of an image which is printed on the printing medium on the basis of the print data.

According to the above configuration, the length of a predetermined image in the width direction is set on the basis of the length in the width direction of an image already printed on the printing medium. Because of this, even in cases where the print data for the purpose of printing an image onto the printing medium is acquired serially in a packetized state by the printing device, the likelihood of the length of the predetermined image in the width direction being equal to or less than the length of the printing medium in the width direction can be increased. Consequently, during printing of the predetermined image onto the printing medium, the likelihood of printing matter being supplied from the printing means towards a position where the printing medium is not present can be reduced.

The printing device of the invention further comprises a data parsing section for parsing the print data, and the width-setting means sets the length of the predetermined image in the width direction in accordance with the image having the greatest length in the width direction from among images printed on the printing medium based on all print data parsed by the data parsing section.

According to the above configuration, the length of the predetermined image in the width direction is set in a state in which the printing device has acquired all print data for the purpose of printing images onto the printing medium. Because of this, the length of the predetermined image in the width direction can be set to the greatest length possible within the printing medium.

The printing device of the invention further comprises conveying means for causing the printing medium to travel in a relative manner in a conveyance direction intersecting the width direction, the printing means being used as a reference, the predetermined image including a dividing line for longitudinally dividing a position where the predetermined image is printed in the conveyance direction.

According to the above configuration, in cases where a printing process is carried out on the basis of print data, a predetermined image that includes a dividing line is printed on the printing medium. Because of this, the appropriate portion in which to divide a printing medium that is finished printing can be readily visually confirmed by a user.

The printing method of the invention provides a printing method having a first printing step for depositing printing matter from printing means onto a printing medium whereby a first image based on acquired print data is printed on the printing medium, and a second printing step for depositing printing matter from the printing means onto a printing medium whereby a second image that extends in the width direction of the printing medium is printed on the printing medium, the printing method further comprising a width-setting step for setting a length of the second image in the width direction on the basis of size of the first image; and in the second printing step, the predetermined image having a length in the width direction that is set in the width-setting step is printed on the printing medium.

According to the above configuration, operation and effects comparable to the printing device described above can be obtained.

DETAILED DESCRIPTION OF EXEMPLARY EMBODIMENTS

First Embodiment

Figure 1A:
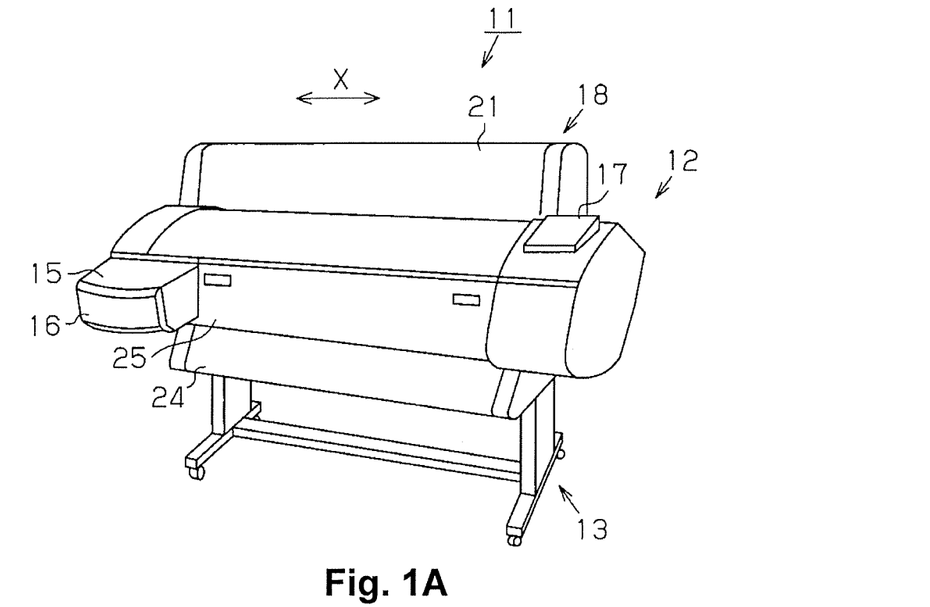
FIGS. 1A and B are schematic perspective views of a printing device of a first embodiment.
Figure 1B:
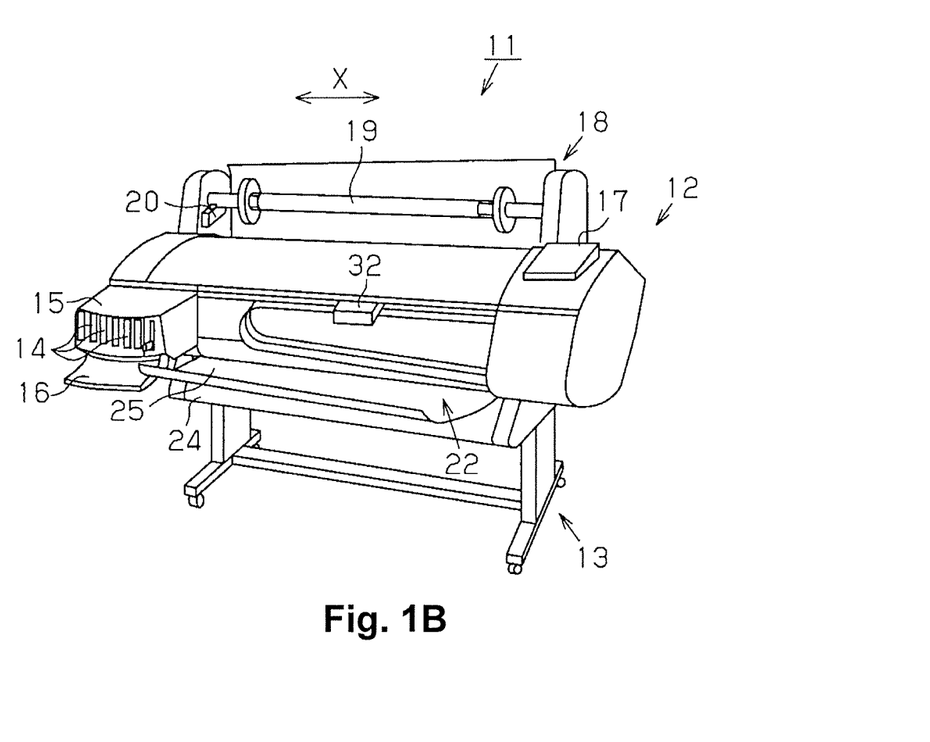

An embodiment of the invention is described below based on FIGS. 1 to 7. FIG. 1A is a perspective view depicting an example of a configuration of the printing device of the present embodiment, and FIG. 1B is a perspective view depicting an example of an internal configuration of major components of the printing device. As depicted in FIGS. 1A and B, a printing device 11 is an inkjet printer of serial type adapted to carry out a printing process on printer paper P of roll form (hereinafter termed "roll paper"), as one example of a printing medium. The printing device 11 comprises a printing device main unit 12 for carrying out the printing process on the roll paper P, and a supporting leg section 13 for supporting the printing device main unit 12 from below in the direction of gravity.

To the left side of the printing device main unit 12 when viewed from the front side thereof there are provided a holder section 15 that contains a plurality of ink cartridges 14 (six in the present embodiment), and a recloseable holder cover 16 that covers the holder section 15 from the front face thereof. The ink cartridges 14 respectively contain ink (printing matter) of mutually different type (e.g., different colors). To the upper right side of the printing device main unit 12 when viewed from the front side thereof, there is provided an operation panel 17 for operation by a user, the operation panel 17 having a liquid crystal screen and various buttons.

On the upper side of the printing device main unit 12 there is provided a medium containing section 18 containing the roll paper P. The roll paper P contained in this medium containing section 18 is wound onto a shaft member 19 that extends along a main scanning direction X. To either side in the main scanning direction X inside the medium containing section 18 there are respectively provided shaft support sections 20 that support the shaft member 19 in a rotatable state.

Through rotation of the shaft member 19 in a predetermined rotation direction (the direction indicated by an arrow in FIG. 3), the roll paper P is reeled out into the printing device main unit 12 as paper of indefinite length. On the front face side of the medium containing section 18 there is provided a detachable containing section cover 21 that covers the roll paper P that is contained inside the medium containing section 18.

Inside the printing device main unit 12 there are provided an ink spraying section 22 adapted to spray ink onto a portion of the roll paper P which has been conveyed into the printing device main unit 12 interior, and a conveying device 23 (see FIG. 3) as one example of conveying means for conveying the roll paper P towards the ink spraying section 22. The printing device main unit 12 is also provided with a paper ejection section 24 for ejecting a portion of the roll paper P on which ink has been deposited by the ink spraying section 22, namely, a portion for which printing is completed. The printing device main unit 12 has a recloseable main unit cover 25 for covering the interior of the printing device main unit 12.

Figure 2:
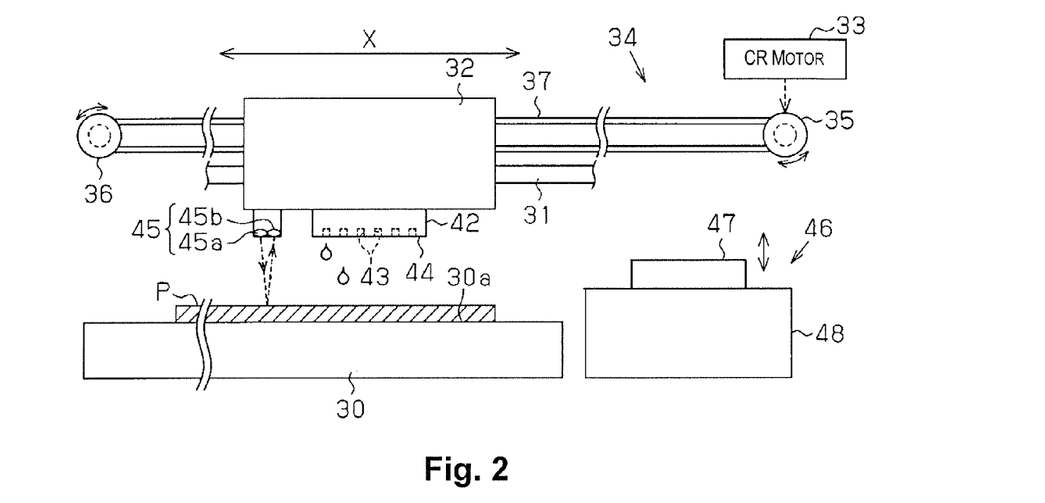
FIG. 2 is a plan view depicting in model form an ink spraying section of the first embodiment.
Figure 3:
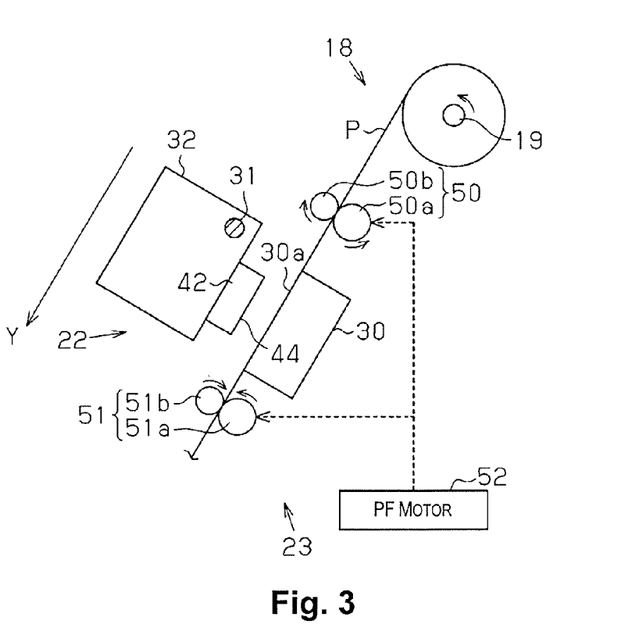
FIG. 3 is a side view depicting in model form an ink spraying section and a conveying device of the first embodiment.

The description turns next to the ink spraying section 22. As depicted in FIG. 2 and FIG. 3, the ink spraying section 22 comprises a support member 30 which extends in the main scanning direction X (the left-right direction in FIG. 2). This support member 30 is disposed such that the upstream side (the side towards the medium containing section 18) is situated above the downstream side (the side towards the paper ejection section 24) in the sub-scanning direction (conveying direction) Y which is substantially orthogonal to the main scanning direction X. Specifically, the support member 30 has a support face 30a that is inclined with respect to the horizontal plane. The support face 30a of the support member 30 supports the portion of the roll paper P which has been conveyed into the printing device main unit 12.

The ink spraying section 22 comprises a guide shaft 31 that extends in the main scanning direction X, and this guide shaft 31 is disposed facing the support face 30a of the support member 30. This guide shaft 31 supports a carriage 32 in a state permitting reciprocating travel thereof along the main scanning direction X.

The ink spraying section 22 comprises a carriage motor (hereinafter also called the "CR motor") 33 which is rotatable in both the forward and reverse directions, and a carriage drive section 34 which transmits drive power output by the CR motor 33 to the carriage 32. This carriage drive section 34 has a pair of pulleys 35, 36 that are supported in a rotatable state at both ends of the back face of the printing device main unit 12 in the main scanning direction X, and the output shaft (not shown) of the CR motor 33 is linked in power-transmissible fashion to one of the pulleys 35 (the one at the right side in FIG. 2). An endless timing belt 37, a portion of which is linked to the carriage 32, is suspended between the pair of pulleys 35, 36. Through transmission of drive power from the CR motor 33 via the carriage drive section 34, the carriage 32 travels along the main scanning direction X while being guided by the guide shaft 31.

Figure 4:
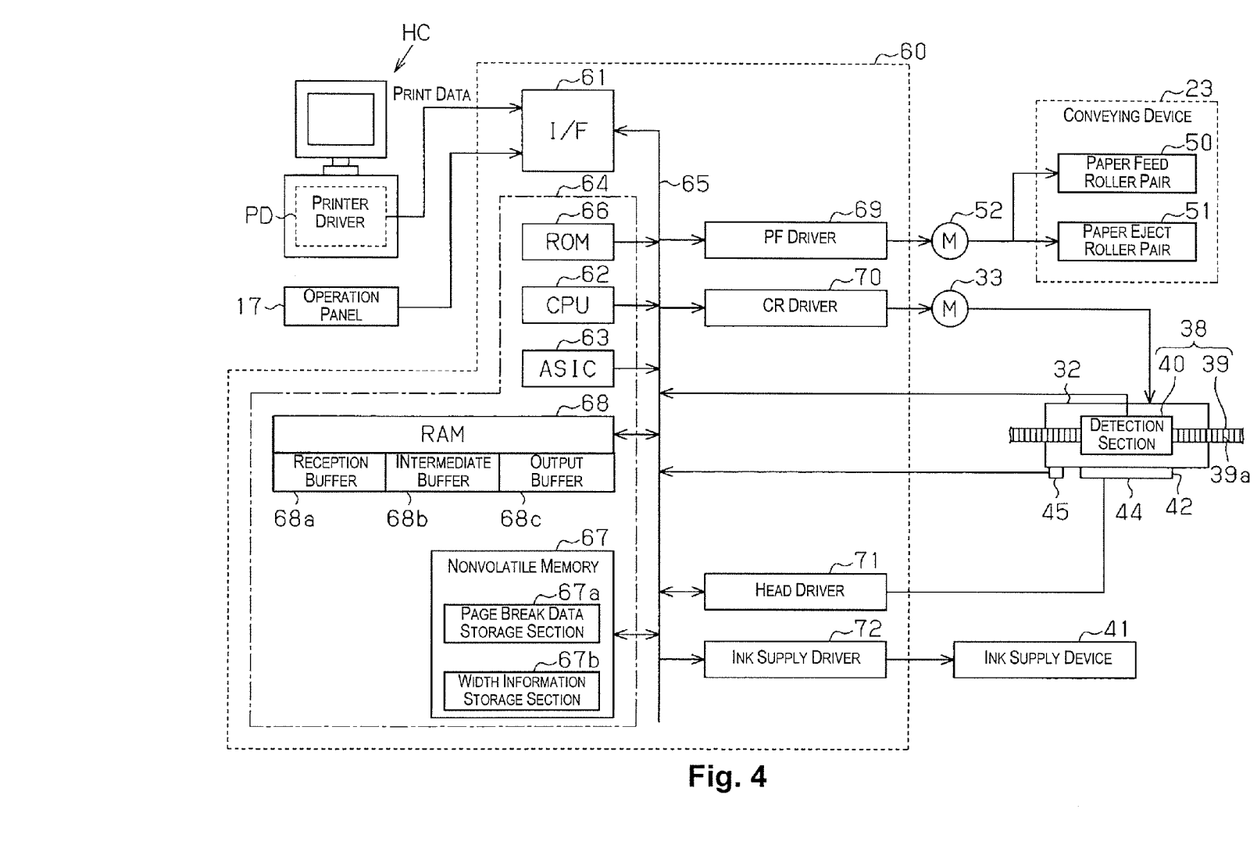
FIG. 4 is a block diagram depicting principal components of the electrical configuration of the printing device of the first embodiment.

To the back face side of the carriage 32 there is provided a linear encoder 38 for the purpose of detecting the position of the carriage 32 in the main scanning direction X, as well as the speed of travel and direction of travel thereof. As depicted in FIG. 4, this linear encoder 38 comprises a tape for detection 39 which extends in the main scanning direction X, and with a detection section 40 which is supported on the carriage 32. The tape for detection 39 is supported in an immovable state on the printing device main unit 12, and has a multitude of slits 39a formed at equal intervals along the main scanning direction X. The detection section 40 has a plurality (e.g., two) of sensors (not shown) which are disposed at mutually different positions in the main scanning direction X. The sensors of the detection section 40 respectively output to a control circuit 60 pulsed detection signals corresponding to the travel distance of the carriage 32 (see FIG. 4).

On the carriage 32, a plurality (six in the present embodiment) of sub-tanks (not shown) are provided for temporary individual storage of the different inks which have been supplied from the ink cartridges 14. These sub-tanks are respectively supplied with inks from the individual corresponding ink cartridges 14 through driving by an ink supply device 41 (see FIG. 4).

A print head 42 is provided to the carriage 32 on the side thereof lying opposite the support member 30. This print head 42 is provided with a plurality (only six are depicted in FIG. 2) of nozzles 43 supplied with the inks from the sub-tanks, and with a plurality of driving elements (e.g., piezoelectric elements; not shown), which individually correspond to the nozzles 43. The nozzles 43 respectively open onto an opposing face 44 (also called the "nozzle formation face") of the print head 42, which face lies opposite the support member 30. The inks supplied from the sub-tanks are sprayed (supplied) from the nozzles 43 towards the support member 30 through driving by the driving elements. Consequently, in the present embodiment, the print head 42 and the carriage 32 constitute the printing means for depositing inks onto a portion of the roll paper P that has been conveyed into the ink spraying section 22.

The carriage 32 on the print head 42 side thereof (the left side in FIG. 2) is provided with an optical type edge detecting sensor 45 having a light emitting section 45a and a light receiving section 45b. In this edge detecting sensor 45, detection light is output from the light emitting section 45a towards the support member 30, and the light receiving section 45b receives reflected light from the support member 30 or from the roll paper P which is supported on the support member 30. A detection signal dependent on the quantity of light received by the light receiving section 45b is then output from the edge detecting sensor 45 to a control circuit 60 (see FIG. 4) discussed later.

To one side of the support member 30 in the main scanning direction X (the right side in FIG. 2) there is formed a home position to which the roll paper P is not supplied, and a maintenance device 46 for carrying out various kinds of maintenance on the print head 42 is provided to the home position. This maintenance device 46 is provided with a cap 47 of bottomed, substantially cylindrical shape adapted to travel in the direction of approach/retreat from the print head 42 which has been positioned at the home position (in FIG. 2, the vertical direction, and the direction orthogonal to the support face 30a), and with a lifting/lowering mechanism 48 for lifting and lowering the cap 47. The cap 47 is adapted to be capable of receiving ink (also termed "waste ink") that is sprayed (discharged) from the nozzles 43 of the print head 42 which has been positioned at the home position. As an example of maintenance, the maintenance device 46 may carry out appropriate processes such as a flushing process, a cleaning process, a defective nozzle detection process, and the like.

The description turns next to the conveying device 23. As depicted in FIG. 3, the conveying device 23 is a device for conveying the roll paper P along the sub-scanning direction Y. This conveying device 23 is provided with a paper feed roller pair 50 disposed to the upstream side (in FIG. 3, the diagonal upper right, on the side towards the medium containing section 18) of the support member 30 in the sub-scanning direction Y, and a paper eject roller pair 51 disposed to the downstream side (in FIG. 3, the diagonal lower left, on the side towards the paper ejection section 24) of the support member 30 in the sub-scanning direction Y. The paper feed roller pair 50 and the paper eject roller pair 51 are respectively composed of drive rollers 50a, 51a which rotate through drive power transmitted from a paper feed motor (hereinafter also termed the "PF motor") 52, and follower rollers 50b, 51b which experience following rotation in association with the rotation of the drive rollers 50a, 51a. Through rotation of the drive rollers 50a, 51a in the direction of the arrows depicted in FIG. 3 by drive power transmitted from the PF motor 52, the roll paper P which is nipped between the roller pairs 50, 51 is fed (conveyed) in the sub-scanning direction Y towards the paper ejection section 24.

In the present embodiment, "conveying of the roll paper P" refers to reeling out of the roll paper P as paper of indefinite length, through rotation of the shaft member 19 in a predetermined direction (the direction depicted by an arrow in FIG. 3) inside the medium containing section 18.

The description turns next to the electrical configuration of the printing device 11. As depicted in FIG. 4, the control circuit 60 of the printing device 11 is connected via an interface 61 to a host device HC, in a state in which sending and receiving of various kinds of information, such as print data, therebetween is possible. Operation information relating to results of operations of the operation panel 17 performed by the user is input to the interface 61 of the control circuit 60.

As depicted in FIG. 3, in the host device HC, the CPU (not shown) of the host device HC and a program together make up a printer driver PD which generates print data. Print data includes commands and image data relating to images for printing onto the roll paper P. The printer driver PD converts the resolution of the image data to the print resolution of the printing device 11, and carries out a color conversion process on the converted image data. Then, the printer driver PD carries out a halftoning process (tone number conversion process) on the color-converted image data.

The printer driver PD then outputs print data including the image data which has undergone the various processes mentioned above to the printing device 11. At this time, the printer driver PD divides the print data into data sequences equivalent to single scan lines of the carriage 32 (hereinafter also referred to as "divided print data sequences"), and sequentially outputs the divided print data sequences to the printing device 11. The commands of a divided print data sequence coming just prior to a point where a page break is desired in the printing process based on the print data in the printing device 11 will include information giving a page break instruction (also termed "page break instruction information").

The description turns next to the control circuit 60 of the printing device 11. The control circuit 60 is provided with a controller 64 (the portion bounded by the dot and dash lines in FIG. 4) having a CPU 62, an application specific IC (ASIC) 63, a ROM 66, a nonvolatile memory 67, and a RAM 68. This controller 64 is electrically connected to various drivers 69, 70, 71, 72 via a bus 65.

The controller 64 controls the PF motor 52 via a PF driver 69, and also controls the CR motor 33 via a CR driver 70. The controller 64 controls the print head 42 (specifically, the drive elements inside the print head 42) via a head driver 71, and controls the ink supply device 41 via an ink supply driver 72.

Various control programs and various data are stored in the ROM 66. Various programs such as a firmware program, as well as various data needed for the printing process, are stored in the nonvolatile memory 67. Specifically, the nonvolatile memory 67 has a page break data storage section 67a for storing data relating to cutoff lines S (herein also called "page break data") as one example of predetermined images for printing onto the roll paper P (see FIG. 6), and a width information storage section 67b for storing various kinds of information needed to set widths H for the cutoff lines S.

Figure 6:
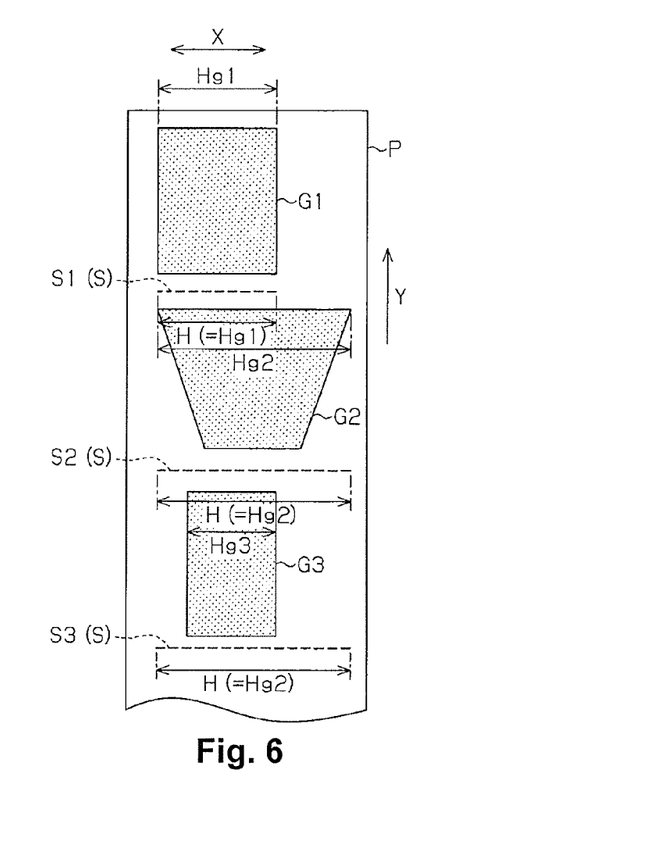
FIG. 6 is a model diagram depicting roll paper with images and dividing lines printed thereon.

As depicted in FIG. 6, in order to facilitate separation of the roll paper P into page units after printing in the printing device 11 of the present embodiment, cutoff lines (e.g., broken lines) S that extend in the main scanning direction X (i.e., the width direction of the roll paper P) are printed, and images G1, G2, G3 which are adjacent to one another in the sub-scanning direction Y are divided by the cutoff lines S. In other words, the cutoff lines S function as dividing lines.

The RAM 68 temporarily stores program data for execution by the CPU 62; various kinds of data resulting from operations and resulting from processes by the CPU 62; various kinds of data processed by the ASIC 63, and the like. The RAM 68 has a reception buffer 68a, an intermediate buffer 68b, and an output buffer 68c. Print data (i.e., divided print data sequences) that has been received from the host device HC is saved to the reception buffer 68a, and data currently being processed is saved to the intermediate buffer 68b. The processed data is saved to the output buffer 68c.

The description next turns to the controller 64 of the present embodiment. Here, the description focuses on functional portions that relate to spraying of ink onto the roll paper P; other functional portions (such as functional portions that relate to paper feed, maintenance, and the like) shall be omitted from the description here.

Figure 5:
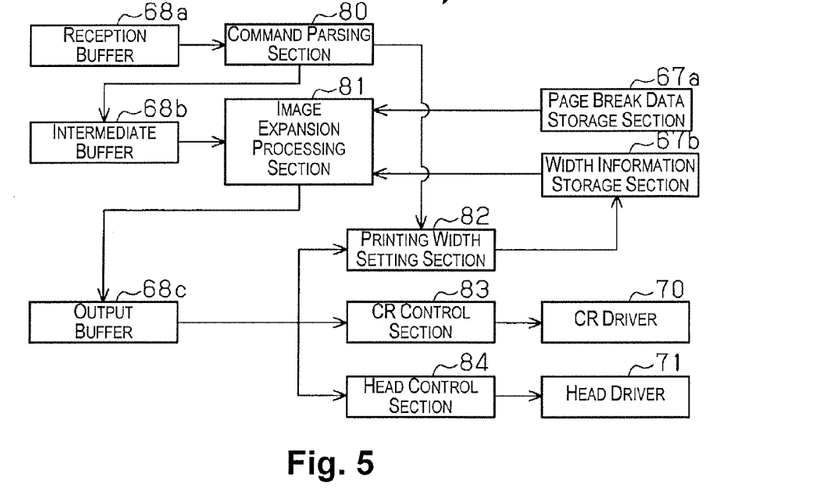
FIG. 5 is a block diagram depicting principal components of the functional configuration of a controller.

As depicted in FIG. 5, the controller 64 is provided, by way of functional portions realized through hardware and/or software, with a command parsing section 80, an image expansion processing section 81, a printing width setting section 82, a CR control section 83, and a head control section 84.

The command parsing section 80 parses (interprets) commands included in the print data (divided print data sequences) that have been temporarily saved to the reception buffer 68a, and generates intermediate code. The command parsing section 80 then saves the intermediate code so generated to the intermediate buffer 68b.

The image expansion processing section 81 converts the intermediate code that was saved to the intermediate buffer 68b to bitmap data in which print dots are indicated by tone values, and expands the bitmap data into the RAM 68. The image expansion processing section 81 also carries out a series of expansion processes of data sequences, each equivalent to a single scan (also referred to as a "single pass"), and saves bitmap data (tone value data) equivalent to single scans in the output buffer 68c. Here, "bitmap data equivalent to one scan" refers to the necessary data for spraying ink onto the roll paper P during travel of the carriage 32 one time in the main scanning direction X, in other words, during driving of the printing means one time.

In the case that a command giving a page break instruction was parsed by the command parsing section 80, the image expansion processing section 81 reads out page break data from the page break data storage section 67a and width information from the width information storage section 67b. The image expansion processing section 81 then generates bitmap data equivalent to a single scan of the carriage 32, in such a way that a cutoff line S having a width H set by the width information stored in the width information storage section 67b will print on the roll paper P, and saves the bitmap data so generated to the output buffer 68c. Subsequently, the image expansion processing section 81 resumes the process of saving to the output buffer 68c bitmap data equivalent to single scans, based on the intermediate code that was saved to the intermediate buffer 68b. In other words, data relating to the cutoff line needed when a page break is to be formed is inserted by the image expansion processing section 81 between data for printing on the roll paper P an image based on the print data received from the host device HC.

The printing width setting section 82 parses the bitmap data equivalent to single scans output from the output buffer 68c for the purpose of printing on the roll paper P. Specifically, on the basis of the bitmap data equivalent to a single scan, the printing width setting section 82 acquires the position of the edge to one side in the main scanning direction X (in FIG. 6, the left edge) of a region to be sprayed with ink in the roll paper P, and the position of the edge of this same region to the other side in the main scanning direction X (in FIG. 6, the right edge). Then, on the basis of the acquired positions of the two edges in the main scanning direction X, the printing width setting section 82 calculates a width in the main scanning direction X (herein, also referred to as "acquired image width Hg") for the region to be sprayed with ink in the roll paper P. The printing width setting section 82 also compares the acquired image width Hg so calculated (herein, also referred to as "new acquired image width") with the acquired image width stored in the width information storage section 67b (herein, also referred to as "previous acquired image width"). Then, in the case that the new acquired image width is wider than the previous acquired image width, the printing width setting section 82 stores the new acquired image width in the width information storage section 67b, in other words, updates the acquired image width Hg that is stored in the width information storage section 67b.

In the case that the roll paper P contained in the medium containing section 18 has been replaced, in response to having detected replacement, the printing width setting section 82 resets to "0" the acquired image width Hg that is stored in the width information storage section 67b. The reason for doing so is the possibility that the width of the new roll paper P subsequent to replacement may be different from the width of the old roll paper P prior to replacement.

On the basis of the bitmap data equivalent to single scans output from the output buffer 68c for the purpose of carrying out printing on the roll paper P, the CR control section 83 determines a travel start position and a travel stop position for the carriage 32 during the current scan. Then, on the basis of the travel start position and the travel stop position so determined, the CR control section 83 outputs a control instruction to the CR driver 70. As a result, driving of the CR motor 33 is controlled, and the carriage 32 travels in the main scanning direction X.

The head control section 84 serially transmits to the head driver 71 sequences of bitmap data equivalent to a single scan output from the output buffer 68c for the purpose of carrying out printing on the roll paper P. Thereupon, print timing signals are individually output to the drive elements of the print head 42 from the head driver 71. Then, through driving of the drive elements which have received the print timing signals, ink is sprayed from the nozzles 43 that individually correspond to the drive elements.

Figure 7:
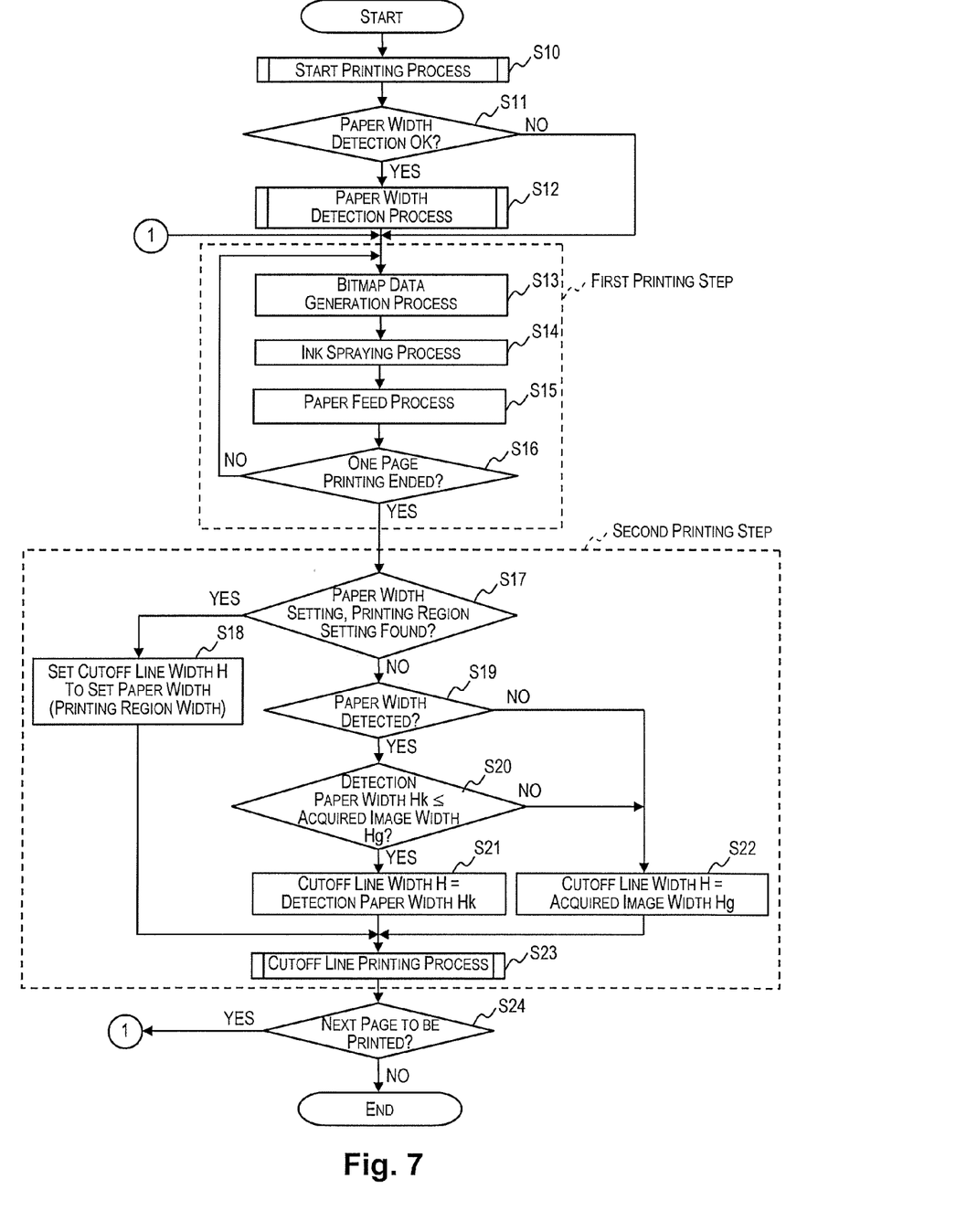
FIG. 7 is a flowchart describing a printing process routine of the first embodiment.

Next, the printing process routine executed by the controller 64 of the present embodiment will be described on the basis of the flowchart depicted in FIG. 7. The printing process routine is executed at timing coincident with the start of reception of print data from the host device HC. Thereupon, in the first Step S10, the controller 64 carries out a printing start process. Specifically, the controller 64 controls the PF motor 52 to advance the leading edge of the roll paper P into the interior of the ink spraying section 22. The controller 64 (the command parsing section 80) also parses commands included in the print data that has been temporarily saved to the reception buffer 68a. Here, through parsing of the commands, the command parsing section 80 acquires the compression format and description format of the print data that was sent from the host device HC, the size (including width) of the printing region in the roll paper P, the size of the paper to be printed (i.e., the paper width), and so on.

There is a possibility that the commands in print data received from the host device HC will differ in content depending on the type of printer driver PD that is installed on the host device HC end. For example, commands in print data from the host device HC having a first printer driver PD may include information relating to the size of the printing region in the roll paper P and the size of the paper to be printed. Meanwhile, commands in print data from the host device HC having a second printer driver PD may not include information relating to the size of the printing region in the roll paper P and the size of the paper to be printed.

In the next Step S11, the controller 64 assesses whether to detect the width of the roll paper P (i.e., paper width). In the case that a setting indicating that detection of paper width should be carried out has been made through an operation of the operation panel 17 by a user (Step S12: YES), the controller 64 advances the process to the next Step S12. On the other hand, in the case that a setting indicating that detection of paper width should not be carried has been made through an operation of the operation panel 17 by a user (Step S12: NO), the controller 64 advances the process to Step S13, discussed later. The width of the roll paper P (i.e., paper width) refers to the length of the roll paper P in the main scanning direction X.

In Step S12, the controller carries out a paper width detection process. Specifically, the controller 64 (the CR control section 83) controls the CR motor 33 so that the carriage 32 travels from the home position to an initial position for detection. The initial position for detection is set, for example, at the center of the support member 30 in the main scanning direction X.

Next, the controller 64 causes the carriage 32 to travel in the main scanning direction X from the initial position for detection. At this time, the controller 64 acquires a detection signal from the edge detecting sensor 45, and also acquires a detection signal from the linear encoder 38. Then, on the basis of the acquired detection signals, the controller 64 calculates the width of the roll paper P (herein, also referred to as "detection paper width Hk"). Here, the width of the roll paper P is calculated by taking into account that the quantity of light received by the light receiving section 45b of the edge detecting sensor 45 varies between reflected light from the support member 30 on the one hand and reflected light from the roll paper P on the other. Consequently, in the present embodiment, the edge detecting sensor 45, the linear encoder 38, and the controller 64 constitute width detecting means for detecting the detection paper width Hk of the roll paper P. However, depending on the type of roll paper P (e.g., the glossiness of the printing surface on which ink is deposited), there is a risk that the detection method described above cannot accurately detect the width of the roll paper P.

Once the carriage 32 has been caused to travel to the home position in the main scanning direction X and the paper width detection process has terminated, the controller 64 advances the process to the next Step S13.

In Step S13, the controller 64 carries out a bitmap data generation process. The controller 64 also carries out an ink spraying process (Step S14) which is substantially simultaneous with and parallel to the bitmap data generation process, then carries out a paper feed process (Step S15). Then, in a case that printing of the equivalent of one page has not yet ended (Step S16: NO), the controller 64 again carries out the processes of the aforementioned Steps S13, S14, S15. Consequently, in the present embodiment, Steps S13 to S16 constitute a first printing step of spraying ink from the print head 42 and printing onto the roll paper P an image based on print data acquired from the printing device 11.

In the bitmap data generation process, sequences of bitmap data equivalent to a single scan are serially saved to the output buffer 68c, and the sequences of bitmap data equivalent to a single scan are output from the output buffer 68c. At this time, the acquired image width Hg stored in the width information storage section 67b is appropriately updated. In the bitmap data generation process, parsing of commands included in the print data is carried out as well.

In the ink spray process, based on the sequences of bitmap data equivalent to a single scan that were output from the output buffer 68c in the bitmap data generation process, the CR control section 83 controls the traveling of the carriage 32, and the head control section 84 controls the spraying of ink from the print head 42. Optionally, the ink spraying process may be executed such that driving of the CR motor 33 starts from before driving of the PF motor 52 stops, so that the spraying of ink from the print head 42 may be carried out simultaneously with or immediately after termination of the paper feed process. Consequently, in the present embodiment, the CR control section 83 and the head control section 84 constitute printing control means for controlling the printing means (the carriage 32 and the print head 42).

In the paper feed process, the portion of the roll paper P positioned opposite the opposing face 44 of the print head 42, in other words, the portion of the roll paper P supported on the support member 30, progressively changes along the sub-scanning direction Y. In this paper feed process, in the case that bidirectional printing is being carried out, the paper feed roller pair 50 and the paper eject roller pair 51 are driven immediately after the spraying of ink from the print head 42 has terminated (or immediately after the carriage 32 has temporarily stopped traveling). Or, in the case that unidirectional printing is being carried out, the paper feed process involves driving the paper feed roller pair 50 and the paper eject roller pair 51 after the ink spraying process has ended and while the carriage 32 is traveling to one side in the main scanning direction X.

On the other hand, in the case that printing of the equivalent of one page has ended (Step S16: YES), the controller 64 advances the process to the next Step S17. Specifically, of the divided print data sequences that were received from the host device HC for the purpose of carrying out printing of the equivalent of one page, the commands of the final divided print data sequence includes page break instruction information. Because of this, through parsing of the commands of the aforementioned final divided print data sequence in the bitmap data generation process, printing of the equivalent of one page is assessed to have ended.

In Step S17, the controller 64 assesses whether the print data that was acquired by the printing device 11 as a result of the process of Step S10 described previously includes at least one of information relating to the width of the paper on which the printing process is carried out (information relating to the paper width setting), and information relating to a printing region in the paper. Then, in the case that at least one of information relating to the paper width setting and information relating to a printing region in the paper is included (Step S17: YES), the controller 64 advances the process to the next Step S18. On the other hand, if neither information relating to the paper width setting nor information relating to a printing region in the paper is included (Step S17: NO), the controller 64 advances the process to Step S19, discussed later.

In Step S18, the controller 64 (the printing width setting section 82) sets the width H of the cutoff line S equal to the paper width that was set (or to the width of the printing region), and stores the width information relating to the width H set in this manner, in the width information storage section 67b. The controller 64 then advances the process to Step S23, discussed later.

Meanwhile, in Step S19, the controller 64 assesses whether the paper width detection process (Step S12) was carried out due to the current iteration of the printing process routine having been executed. In the case that the paper width detection process was carried out (Step S19: YES), the controller 64 advances the process to the next Step S20, or in the case that the paper width detection process was not carried out (Step S19: NO), advances the process to Step S22, discussed later.

In Step S20, the controller 64 assesses whether the detection paper width Hk that was acquired in Step S12 is equal to or less than the acquired image width Hg stored in the width information storage section 67b. In the case that the detection paper width Hk is equal to or less than the acquired image width Hg (Step S20: YES), the controller 64 advances the process to the next Step S21, whereas in the case that the detection paper width Hk is greater than the acquired image width Hg (Step S20: NO), the controller 64 advances the process to Step S22, discussed later.

In Step S21, the controller 64 (the printing width setting section 82) sets the width H of the cutoff line S to equal the detection paper width Hk, and stores width information relating to this set width H in the width information storage section 67b. The controller 64 then advances the process to Step S23, discussed later.

Meanwhile, in Step S22, the controller 64 (the printing width setting section 82) sets the width H of the cutoff line S to equal the acquired image width Hg, and stores width information relating to this set width H in the width information storage section 67b. Consequently, in the present embodiment, the printing width setting section 82 functions as width-setting means for setting the width H of the cutoff lines S. Step S22 corresponds to the width-setting step for setting the width of the cutoff line S. The controller 64 then advances the process to Step S23, discussed later.

In Step S23, the controller 64 carries out a cutoff line printing process. Specifically, the image expansion processing section 81 reads out page break data from the page break data storage section 67a, and width information (width H) from the width information storage section 67b. The image expansion processing section 81 then generates bitmap data such that a cutoff line S of the width H that was set in any one of Steps S18, S21, or S22 is printed on the roll paper P, and saves the bitmap data so generated to the output buffer 68c. Next, on the basis of the bitmap data saved to the output buffer 68c, the CR control section 83 controls traveling of the carriage 32, and the head control section 84 controls the mode by which ink is sprayed by the print head 42. Consequently, in the present embodiment, Steps S17 to S23 constitute the second printing step for printing a cutoff line S that extends in the main scanning direction X (the roll paper P width direction) onto the roll paper P. Then, once the cutoff line printing process has terminated, the controller 64 advances the process to the next Step S24.

In Step S24, the controller 64 assesses whether there is a next page to be printed. In the case that there is a next page to be printed (Step S24: YES), the controller 64 advances the process to Step S13 described previously. On the other hand, in the case that there is no next page to be printed (Step S24: NO), the controller 64 terminates the printing process routine.

In the case that a printing process routine such as this is executed, as one example, a plurality of images G1, G2, G3 and cutoff lines (S1, S2, S3) depicted in FIG. 6 are printed on the roll paper P.

Here, let it be assumed that the print data acquired by the printing device 11 includes neither information relating to the paper width setting nor information relating to a printing region in the paper, and that the paper width detection process is not carried out.

A first page image (hereinafter referred to as the "first image") G1 is printed furthest downstream in the sub-scanning direction Y of the roll paper P (the upper side in FIG. 6). The width in this first image G1, in other words, the acquired image width Hg, is a first image width Hg1. Because of this, the width H of the cutoff line S1 (S) printed between the first page and the second page is equal to the first image width Hg1.

When printing of the cutoff line S1 ends, a second page image (hereinafter also termed the "second image") G2 is printed to the upstream side (the lower side in FIG. 6) of the cutoff line S1 in the sub-scanning direction Y of the roll paper P. In this second image G2, in the case that the second image G2 is fragmented along the sub-scanning direction Y, the width (equal to a second image width Hg2) of that portion closest to the cutoff line S1 in the sub-scanning direction Y is the largest. Moreover, because the second image width Hg2 is greater than the first image width Hg1, the width H of the cutoff line S changes to the second image width Hg2. As a result, the width H of the cutoff line S2 (S) that is printed between the second page and the third page is equal to the second image width Hg2.

When printing of the cutoff line S2 ends, a third page image (hereinafter referred to as the "third image") G3 is printed to the upstream side of the cutoff line S2 in the sub-scanning direction Y of the roll paper P. The width of this third image G3 is a third image width Hg3 that is less than the second image width Hg2. Because of this, the width H of the cutoff line S is maintained at the second image width Hg2. As a result, the width H of the cutoff line S3 (S) that is printed between the third page and the fourth page is equal to the second image width Hg2. In other words, in the present embodiment, the width H of the cutoff lines S (S1, S2, S3 . . . ) is set progressively greater in association with greater width (Hg1, Hg2, Hg3 . . . ) of the images (G1, G2, G3 . . . ) already printed on the roll paper P.

According to the embodiment described above, effects such as the following can be obtained.

(1) The width H of the cutoff lines S (S1 to S3) described herein as one example of predetermined images is set depending on the size of images (G1 to G3) which are printed on the roll paper P on the basis of print data acquired by the printing device 11. Based on the results of these settings, the cutoff lines S are printed on the roll paper P by spraying ink from the print head 42. Normally, the likelihood of the printing device 11 acquiring print data for the purpose of printing an image that has width greater than the width of the roll paper P is considered to be quite low. Because of this, there is a high likelihood that a cutoff line S having a smaller width than the width of the roll paper P will be printed on the roll paper P. Consequently, during printing of the cutoff line S on the roll paper P, it is possible to reduce the likelihood of ink being sprayed from the print head 42 towards a position where the roll paper P is not present in the main scanning direction X.

(2) Because of this, there is less likelihood of the support face 30a side of the support member 30 becoming soiled by ink. Consequently, soiling of the face of the roll paper P on the side thereof that does not undergo the printing process, in other words, the underside face, can be suppressed. The duration or frequency of maintenance to wipe away soiling from the support member 30 can be reduced as well.

(3) In a typical printer driver PD, print data for transmission to the printing device 11 includes commands that include information relating to settings for the paper on which an image is to be printed or to printing region settings. However, some printer drivers PD generate print data lacking commands that include information relating to settings for the paper on which an image is to be printed or to printing region settings, and transmit this print data to the printing device 11. In the present embodiment, even in cases where print data lacking commands that include information relating to settings for the paper on which an image is to be printed or to printing region settings is received, the width H of cutoff lines S can be set to values that do not exceed the width of the roll paper P.

(4) The host device HC serially transmits print data in a packetized state to the printing device 11. In other words, the printing device 11 serially receives divided print data sequences. The printing device 11 then carries out a command parsing process and a data expansion process on the basis of the divided print data sequences, in the order in which they were received. As a result, bitmap data sequences equivalent to single scans are serially saved to the output buffer 68c. Then, when a bitmap data sequence equivalent to a single scan is output from the output buffer 68c, the acquired image width Hg of the region to be sprayed with ink in the roll paper P is calculated on the basis of the bitmap data sequence equivalent to a single scan. The widths H of the cutoff lines S are set on the basis of the acquired image width Hg calculated in this manner. Because of this, setting of the width H of a cutoff line S to a value greater than the width of the roll paper P is suppressed. Consequently, during printing of a cutoff line S onto the roll paper P, it is possible to reduce the likelihood of ink being sprayed from the print head 42 towards a position where the roll paper P is not present in the main scanning direction X.

(5) Moreover, an acquired image width Hg is calculated each time that a bitmap data sequence equivalent to a single scan is output from the output buffer 68c. The maximum value of the values for the acquired image width Hg calculated each time in this way is stored in the width information storage section 67b. The width H of the cutoff line S is then set on the basis of the acquired image width Hg stored in the width information storage section 67b. Because of this, a cutoff line S of the greatest length possible can be printed on the roll paper P, and subsequent to printing, the roll paper P can be readily separated along the cutoff line S.

(6) In the case that the printing process is carried out on the basis of print data, a cutoff line S corresponding to a dividing line is printed on the roll paper P. Because of this, the appropriate portion in which to divide the roll paper P that is finished printing can be readily visually confirmed by a user.

(7) The width of the roll paper P, in other words, the detection paper width Hk, is detected using the edge detecting sensor 45 (optical type sensor) which is installed on the carriage 32. However, depending on the type of paper (e.g., the glossiness), there is a risk of not being able to accurately detect the detection paper width Hk. In the case that an inaccurate detection paper width Hk is set as the width H, there is a possibility of ink being mistakenly sprayed onto a portion where the paper is absent during printing of a cutoff line S onto the paper. With respect to this point, according to the present embodiment, the detection paper width Hk and the acquired image width Hg are compared even in cases where the detection paper width Hk has been detected. Then, in the case that the acquired image width Hg is less than the detection paper width Hk, the width H of the cutoff line S is set equal to the acquired image width Hg. Because of this, during printing of the cutoff line S onto the roll paper P, there is reduced likelihood of ink spraying from the print head 42 towards a position where the roll paper P is not present in the main scanning direction X.

(8) In the present embodiment, the width information storage section 67b is constructed in the nonvolatile memory 67. Because of this, when carrying out a printing process based on a current job (this may be paraphrased as "current print data" as well), a cutoff line S based on width information acquired in the previous job (this may be paraphrased as "previous print data" as well) can be printed on the roll paper P.

(9) In the case that the roll paper P contained in the medium containing section 18 has been replaced, due to the possibility that the width of the roll paper P before replacement and the width of the roll paper P after replacement may be different, the width information and acquired image width Hg stored in the width information storage section 67b are deleted. Consequently, in the case that the width of the roll paper P after replacement is less than the width of the roll paper P before replacement, when a cutoff line S is printed during printing onto the roll paper P after replacement, the spray of ink from the print head 42 towards a portion where the roll paper P is absent can be suppressed.

Second Embodiment

Figure 8:
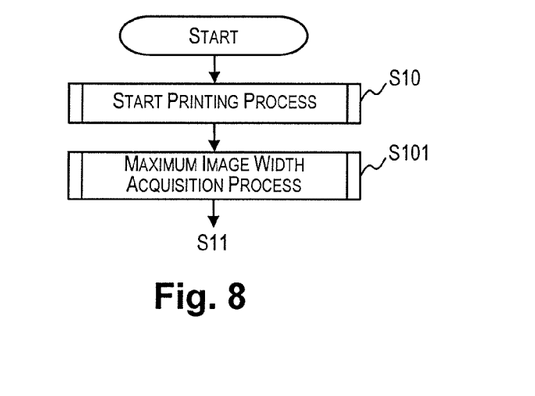
FIG. 8 is a flowchart describing principal components of a printing process routine of a second embodiment.
Figure 9:
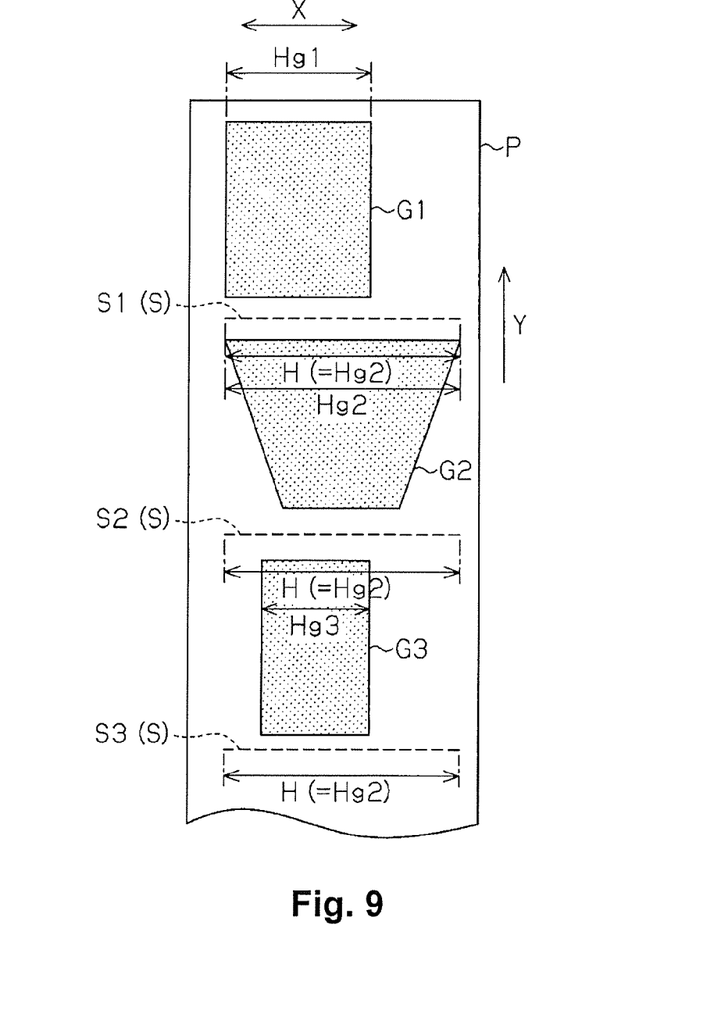
FIG. 9 is a model diagram depicting roll paper with images and dividing lines printed thereon.

Next, a second embodiment of the invention is described on the basis of FIG. 8 and FIG. 9. The second embodiment differs from the first embodiment in terms of the method for setting the width H of the cutoff lines S. Consequently, in the following description, the description will focus on portions different from the first embodiment, and configurations of members identical to or corresponding with those in the first embodiment are assigned like symbols, while omitting redundant description.

In the present embodiment, all of the print data from the host device HC is saved to the reception buffer 68a of the RAM 68. The controller 64 then carries out various processes on the print data saved in the reception buffer 68a, and serially saves bitmap data sequences equivalent to single scans to the output buffer 68c. Subsequently, the controller 64 outputs bitmap data sequences equivalent to single scans from the output buffer 68c, and carries out a printing process. That is, in the present embodiment, in contrast to the case in the first embodiment described previously, the process for printing onto the roll paper P starts once reception of print data from the host device HC has ended.

Next, the printing process routine executed by the controller 64 of the present embodiment is described based on the flowchart depicted in FIG. 8.

The printing process routine is executed at timing coincident with the start of reception of the print data from the host device HC. Thereupon, in the first Step S10, the controller 64 carries out a printing start process. Specifically, the controller 64 controls the PF motor 52 so as to advance the leading edge of the roll paper P into the interior of the ink spraying section 22. The controller 64 (the command parsing section 80) also parses commands included in the print data that has been temporarily saved to the reception buffer 68a.

In the next Step S101, at the moment that reception of print data has ended, the controller 64 carries out a maximum image width acquisition process. In other words, by carrying out processing of the print data saved to the reception buffer 68a, the controller 64 detects the image of greatest width among the plurality of images to be printed on the roll paper P based on the print data. Further, the controller 64 fragments the image of greatest width into a plurality of portions in the sub-scanning direction Y, and stores the width of the widest portion to the width information storage section 67b as the acquired image width Hg. Consequently, in the present embodiment, the command parsing section 80 and the image expansion processing section 81 constitute a data parsing section.

Subsequently, the controller 64 advances the process to Step S11 described previously. Step S11 and the following processes are substantially the same as in the first embodiment, and therefore a detailed description is omitted here.

In the case that a printing process routine such as this is executed, a plurality of images G1, G2, G3 and cutoff lines (S1, S2, S3) depicted in FIG. 9 are printed on the roll paper P. Here, let it be assumed that the print data acquired by the printing device 11 includes neither information relating to the paper width setting nor information relating to a printing region in the paper, and that the paper width detection process is not carried out.

A first page image, namely, a first image G1, is printed furthest downstream in the sub-scanning direction Y of the roll paper P (the upper side in FIG. 9). The acquired image width Hg of this first image G1 is a first image width Hg1. Subsequently, a cutoff line S1 (S) is printed between the first page and the second page. The width H of this cutoff line S1 is a second image width Hg2 which is greater than the first image width Hg1. The reason is that, of the images G1, G2, G3 to be printed on the roll paper P according to the current print data, the image having the maximum width is the second image G2, and so the acquired image width Hg of the second image G2 is the second image width Hg2.

When printing of the cutoff line S1 ends, a second page image (hereinafter referred to as the "second image") G2 is printed to the upstream side (the lower side in FIG. 9) of the cutoff line S1 in the sub-scanning direction Y of the roll paper P. Subsequently, a cutoff line S2 (S) having the second image width Hg2 is printed between the second page and the third page of the roll paper P.

Consequently, in addition to effects comparable to the effects (1) to (3) and (6) to (10) in the first embodiment described previously, the present embodiment further affords the effects below.

(11) In the present embodiment, the print data for printing images onto the roll paper P is parsed once all of the print data in question has been received by the printing device 11. The width H of the cutoff lines S is then set on the basis of the image of greatest width among the images to be printed on the roll paper P based on the print data. Because of this, cutoff lines S of the greatest length possible can be printed on the roll paper P.

(12) Further, in the first embodiment described previously, when a plurality of cutoff lines S (S1 to S3) are printed on the roll paper P, there is a possibility of the widths H of the cutoff lines S differing from one another.

According to the present embodiment, however, the widths H of the cutoff lines S printed on the roll paper P can be set to a constant width. Consequently, the appearance of the printed product can be made better than with the first embodiment.

Optionally, the embodiments described previously may be modified as follows. In the first embodiment, the widths H of the cutoff lines S may be set on the basis of the travel position of the carriage 32. In other words, in the case that images (G1, G2, G3) are to be printed on the roll paper P, in the course of one pass of travel of the carriage 32, the position at which the spray of ink from the print head 42 starts and the position at which the spray of ink terminates are detected on the basis of detection signals from the linear encoder 38. The acquired image width Hg of the images (G1, G2, G3) may then be calculated based on the detection result.

Figure 10:
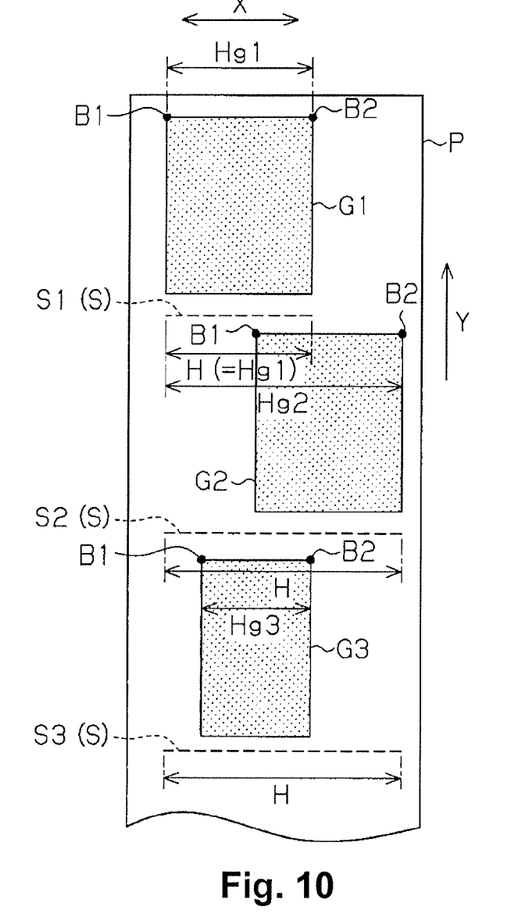
FIG. 10 is a model diagram depicting roll paper with images and dividing lines printed thereon in another embodiment.

In the first embodiment, the width H of cutoff lines S may be set by the following method. Namely, as depicted in FIG. 10, based on bitmap data sequences equivalent to single scans, the printing width setting section 82 acquires a position (hereinafter also referred to as a "first position") B1 of an edge at one side in the main scanning direction X of a region of the roll paper P to be sprayed with ink, and a position (hereinafter also referred to as a "second position") B2 of the edge at the other side of the region in the main scanning direction X. Then, in the case that the acquired first position B1 is positioned further towards the left side in FIG. 10 than the first position B1 stored in the width information storage section 67b, the printing width setting section 82 overwrites and stores the acquired first position B1 to the width information storage section 67b. Similarly, in the case that the acquired second position B2 is positioned further towards the right side in FIG. 10 than the second position B2 stored in the width information storage section 67b, the printing width setting section 82 overwrites and stores the acquired second position B2 to the width information storage section 67b. The printing width setting section 82 then sets the width H of the cutoff lines S on the basis of the first position B1 and the second position B2 that are stored in the width information storage section 67b.

With this configuration, even in cases where the images G1, G2, G3 printed on the roll paper P on the basis of the print data differ in position in the main scanning direction X, cutoff lines S of the greatest possible length can be printed on the roll paper P.

In the embodiments, provided that the width H of the cutoff lines S printed on the roll paper P is sufficient to provide an indicator during separation of the roll paper P after printing, the width may be set less than the acquired image width Hg. In other words, the width H of the cutoff lines S printed on the roll paper P may be set so as to not exceed the width of images printed on the roll paper P on the basis of print data.

In the embodiments, provided that the cutoff lines S have a style and weight that are visually confirmable by a user, any number of styles other than a broken line (a dot-and-dash line, a fine line, or the like) are acceptable as well.

Figure 11:
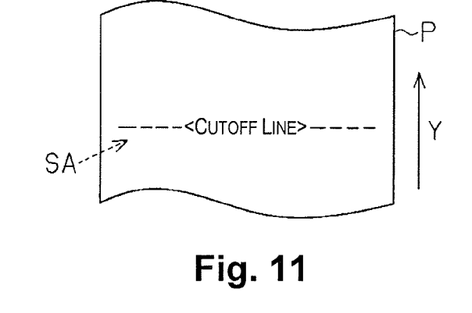
FIG. 11 is a model diagram depicting principal components of roll paper with predetermined images printed thereon in another embodiment.

In the embodiments, the predetermined image may be an image SA that includes a cutoff line and text (e.g., "<Cutoff line>"), as depicted in FIG. 11.

In the embodiments, provided that the predetermined image is one that can divide images longitudinally in the sub-scanning direction Y of the roll paper P, the image need not be a cutoff line. For example, the predetermined image may be a fold line provided as an indicator for folding the roll paper P after printing.

Also, provided that the predetermined image is one that provides an indicator for division of images longitudinally in the sub-scanning direction Y of the roll paper P, any number of images besides lines (e.g. text strings or trim marks) are acceptable.

In the embodiments, the width information storage section 67b may be set in the RAM 68.

In the embodiments, the information stored in the width information storage section 67b may be reset in cases where new print data has been received. In order to suppress the spray of ink towards a portion where the roll paper P is absent, it is particularly preferable to do so in cases where replacement of the paper or a change has gone unnoticed by the printing device. In the embodiments, the printing device 11 may be a device lacking the edge detecting sensor 45. In this case, in the printing process routine, Steps S11 and S12 may be omitted. In the printing process routine, Steps S19, S20, and S21 may be omitted as well, and in cases where the result of the assessment performed in Step S17 is negative (NO), the process of Step S22 may be executed.

In the embodiments, the printing device 11 may be a printing device capable of direct acquisition of print data from an external memory (a memory card or the like), from a digital camera, or the like, without going through a host device HC.

The printing device 11 may be a multifunction device provided with a scanner section and the like.

In the embodiments, the printing device 11 may be a printing device of a so-called line head type in which the print head does not travel during printing, or a printing device of a so-called lateral type having a plurality of print heads 42 disposed in the main scanning direction X.

In the embodiments, the printing medium printed by the printing device 11 is not limited to roll paper, and may be some other type of paper (e.g., computer paper).

In the embodiments, the printing device 11 may be embodied in a printer of a so-called on-carriage type, in which the ink cartridges 14 are detachably installed on the carriage 32.

Whereas an inkjet printer is used as the printing device 11 in the embodiments, fluid spraying devices that spray or eject other fluids besides ink may be adopted as well. Adaptation for use in liquid spraying devices of various types provided with a liquid spraying head or the like for ejecting minutely small droplets is also possible. In this case, drop refers to the state in which a liquid is ejected from the liquid spraying device, and includes granular shape, teardrop shape, or filiform shape having a tail. Herein, liquid refers to any material that can be sprayed from a liquid spraying device. For example, any state when a substance is in the liquid phase is acceptable, including not only liquid bodies of high or low viscosity, sols, gel water, or other fluid bodies such as inorganic solvents, organic solvents, solutions, liquid resins, and liquid metals (molten metals), and liquids containing a single state of a substance, but including also materials in which particles of functional materials composed of solids such as pigments, metal powders, or the like are dissolved, dispersed, or admixed into a medium. Ink, such as described in the preceding embodiments, or liquid crystals, may also be cited as typical examples of liquids. Here, the term "ink" is used in a sense inclusive of ordinary water based inks and oil based inks, as well as various types of liquid compositions such as gel inks, hot-melt inks, and the like. Specific examples of liquid spraying devices include liquid spraying devices for spraying liquids that contain materials such as electrode materials or coloring matter in dispersed or dissolved form, used for manufacturing, for example, liquid crystal displays, electroluminescence (EL) displays, surface emitting displays, color filters, and the like. Further, liquid spraying devices for spraying bioorganic compounds for use in biochip manufacture; liquid spraying devices for spraying specimen liquids and for use as a precision pipettes; textile printing devices; microdispensers; and the like are acceptable as well. Further, liquid spraying devices for pinpoint spraying of lubricants into precision instruments such as clocks or cameras; liquid spraying devices adapted to spray solutions of ultraviolet-curing resins or other transparent resins onto substrates for the purpose of forming very small semi-spherical lenses (optical lenses) for use in optical communication elements or the like; or liquid spraying devices adapted to spray acid, alkali, or other etchant solutions for etching substrate and the like may be adopted as well. The invention may be implemented in any one of these types of liquid spraying device. Additionally, powder bodies such as toner are also acceptable as the fluid. In the present Specification, the term "fluid" does not include fluids consisting of a gas only.

In the embodiments, the printing device 11 may be a printing device of another printing format, such as dot impact format or laser format. Next, a technical idea which can be appreciated from the embodiments described above and from other embodiments is appended below.

(I) A printing device characterized by further comprising width detection means for detecting a length of a printing medium in the width direction, wherein the printing control means controls the printing means such that in a case that the length in the width direction of the printing medium that was detected by the width detection means is smaller than the length in the width direction that was set by the width-setting means, an aforementioned predetermined image having the length in the width direction of the printing medium that was detected by the width detection means is printed on the printing medium.

There is also a possibility of the printing device acquiring print data for printing an image whose length in the width direction is greater than the length of the printing medium in the width direction. In the invention, in cases where length in the printing medium width direction can be detected by width direction detection means, when the length in the width direction that was set by the width-setting means is greater than the length in the printing medium width direction detected by the width detection means, a predetermined image having the length in the width direction of the printing medium detected by the width detection means is printed on the printing medium. Consequently, during printing of the predetermined image onto the printing medium, the likelihood of printing matter being supplied from the printing means towards a position where the printing medium is not present can be reduced.

The entire disclosure of Japanese Patent Application No. 2010-140553, filed Jun. 21, 2010, is incorporated by reference herein.

What is claimed is:

1. A printing device, comprising:
   a printing section that deposits printing matter onto a printing medium;
   a printing control section that controls the printing section so that a first image that is based on acquired print data and a second image that extends in a width direction of the printing medium are printed on the same printing medium, the printing control section including a width-setting section that sets the length of the second image in the width direction to a length dependent on the size of the first image; and
   a data parsing section that parses the print data,
   the width-setting section setting the length of the second image in the width direction in accordance with the image having the greatest length in the width direction from among the first image based on all print data parsed by the data parsing section.

2. The printing device according to claim 1, wherein the width-setting section sets the length for the second image in the width direction to a greater length in association with a greater length of the at least one first image in the width direction.

3. The printing device according to claim 1, wherein in a case that the printing medium is replaced, the width-setting section sets the length of the second image in the width direction irrespectively of print data parsed up to the point that replacement is detected.

4. The printing device according to claim 1, further comprising:
   a conveying section that causes the printing medium to travel in a relative manner in a conveyance direction intersecting the width direction, the printing section being used as a reference;
   wherein the second image includes a dividing line for dividing the first image which is printed in front of or to the rear of a position in which the second image is printed in the conveyance direction.

5. A printing method, comprising:
   depositing printing matter from a printing section onto a printing medium whereby at least one first image based on acquired print data is printed onto the printing medium;
   depositing printing matter from the printing section onto a printing medium where a second image that extends in a width direction of the printing medium is printed on the printing medium;
   parsing the print data;
   setting a length of the second image in the width direction in accordance with the image having the greatest length in the width direction from among the at least one first image based on all parsed print data;
   the depositing of the printing matter including printing the second image having the length in the width direction that is set in the setting the length of the second image on the printing medium.

* * * * *